(12) United States Patent
Bootsma et al.

(10) Patent No.: US 7,721,984 B2
(45) Date of Patent: May 25, 2010

(54) HAY BALE FLAKE-SEPARATING AND FLAKE-DISPENSING SYSTEM AND DEVICE

(76) Inventors: Thomas Bootsma, 2604 11th St., Baker City, OR (US) 97814; Denzil Robbins, Rt. 1 Box 46, Baker City, OR (US) 97814

( * ) Notice: Subject to any disclaimer, the term of this patent is extended or adjusted under 35 U.S.C. 154(b) by 0 days.

(21) Appl. No.: 12/074,179

(22) Filed: Feb. 29, 2008

(65) Prior Publication Data

US 2008/0213066 A1    Sep. 4, 2008

Related U.S. Application Data

(60) Provisional application No. 60/904,602, filed on Mar. 1, 2007.

(51) Int. Cl.
*B02C 7/00* (2006.01)
*B02C 7/12* (2006.01)
*B02C 17/20* (2006.01)

(52) U.S. Cl. ............... 241/277; 241/280; 241/605; 241/101.76

(58) Field of Classification Search ........... 241/277, 241/605, 280, 101.76
See application file for complete search history.

(56) References Cited

U.S. PATENT DOCUMENTS 2,282,887 A    5/1942 Roberts
2,659,537 A * 11/1953 Keon ..................... 241/222
3,129,739 A *  4/1964 Wenger ................... 241/55
4,151,961 A *  5/1979 Makofka et al. ........ 241/101.76
4,170,426 A * 10/1979 White et al. ............ 414/111
4,370,796 A *  2/1983 Wilson .................. 29/564.3
5,217,174 A *  6/1993 Martin et al. ........... 241/222
5,895,001 A *  4/1999 Kuelker et al. ......... 241/101.76
5,997,233 A * 12/1999 Whatley et al. ......... 414/25
6,116,838 A *  9/2000 Whatley et al. ......... 414/25
6,659,377 B1 * 12/2003 Coulter et al. .......... 241/60
6,817,820 B2 * 11/2004 Ackerman et al. ...... 414/25
7,090,456 B2 *  8/2006 Ost et al. ............... 414/111
7,347,659 B2 *  3/2008 Maclay ................. 414/703

OTHER PUBLICATIONS

Vough, Evaluating Hay Quality, Countryside and Small Stock Journal, Nov./Dec. 2002, Lester Vough, http://www.countrysidemag.com/issues/86/86-6/Lester-Vough.html, USA.

* cited by examiner

*Primary Examiner*—Bena Miller
(74) *Attorney, Agent, or Firm*—Ater Wynne LLP

(57) ABSTRACT

A chain driven push arm advances a hay bale along a bed toward an opening including a pair of vertically aligned, spaced-apart idle wheels each including plural radiating blades. As the hay bale advances along the bed, the wheels rotate freely causing the blades to impinge on successive regions of the hay bale to separate a succession of flakes from the hay bale remainder. The bed is mounted on a wheeled truck or vehicle that is towable behind a tractor as the tractor driver remotely selectively operates the push arm to dispense flakes along the ground. An optional, towable conveyor can be used to load the bed with a succession of hay bales.

12 Claims, 10 Drawing Sheets

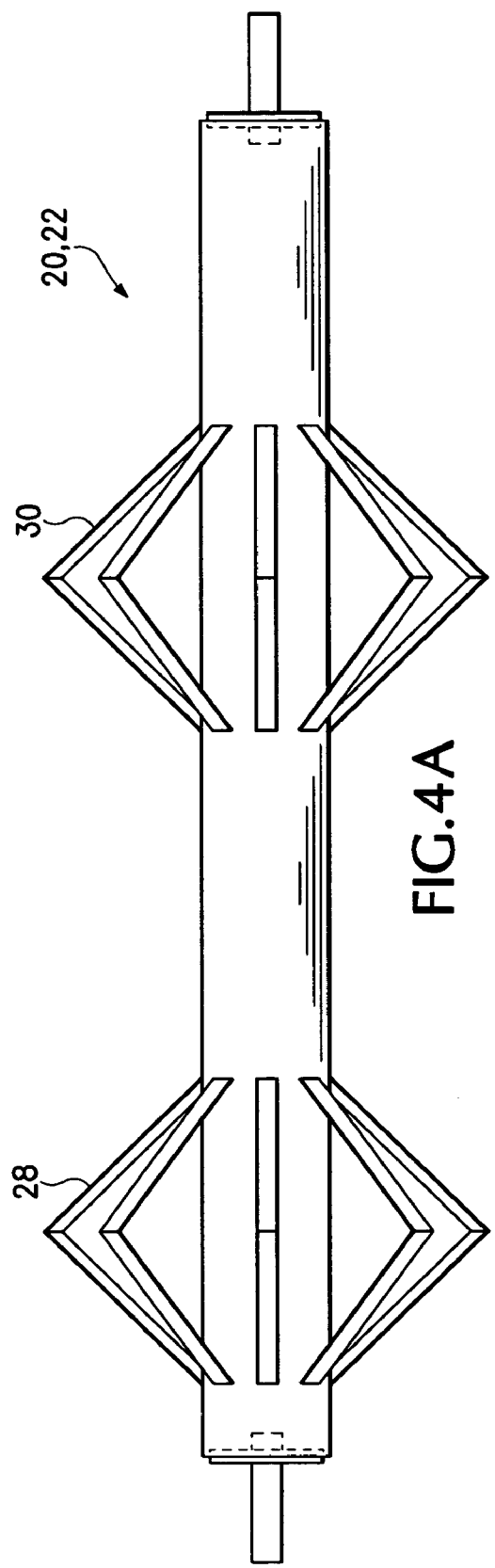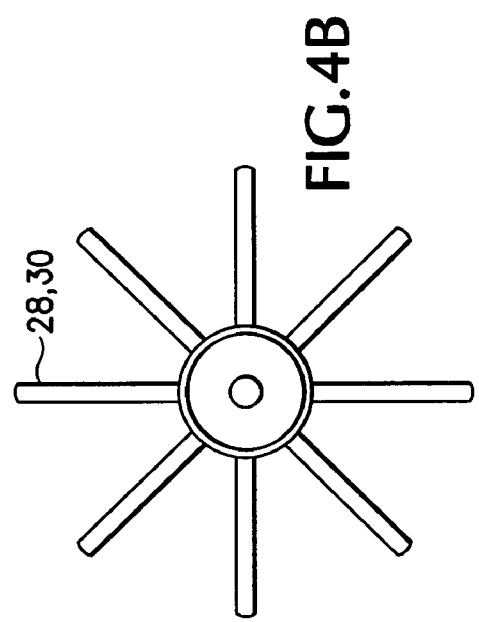
FIG.4A
FIG.4B

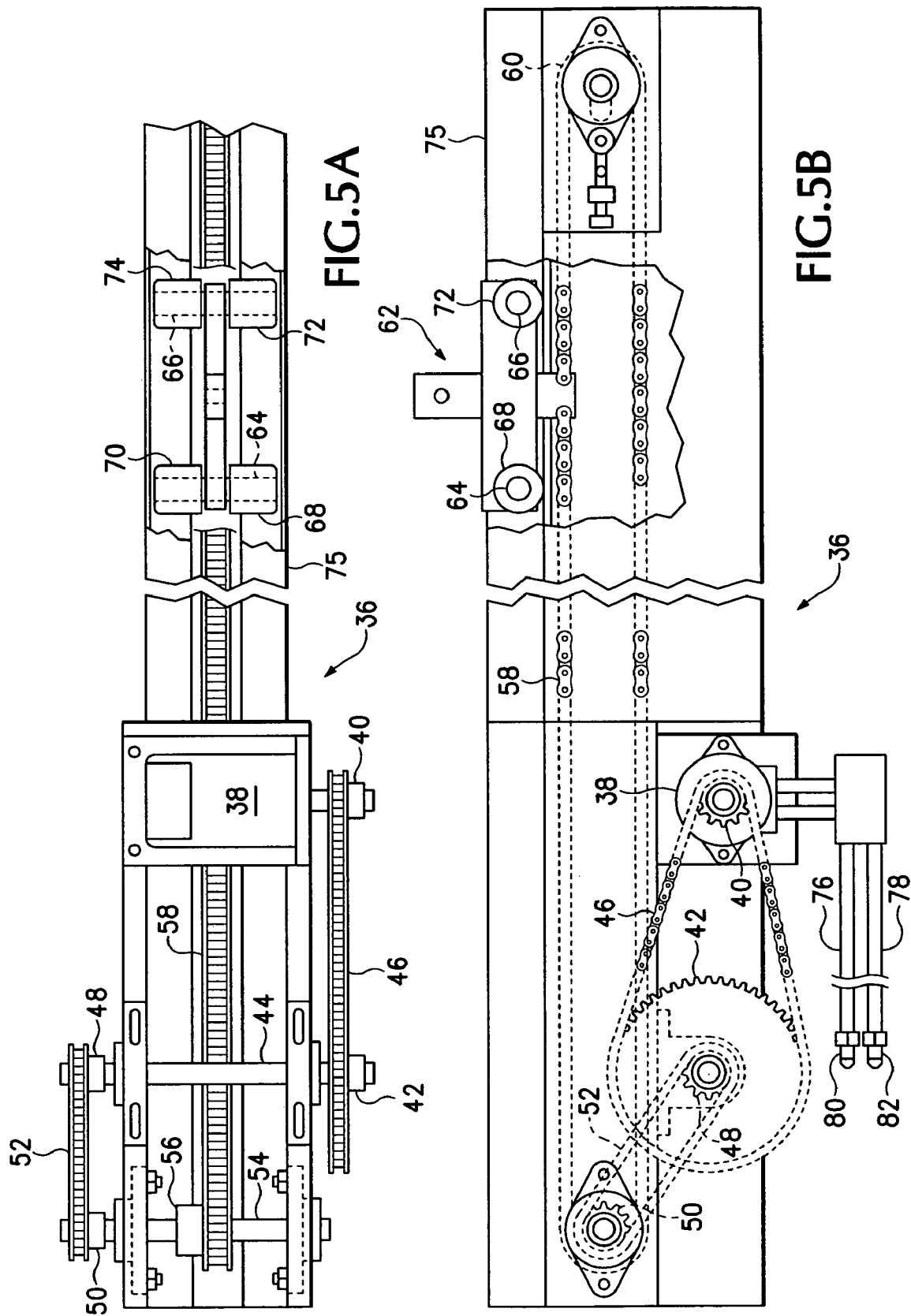

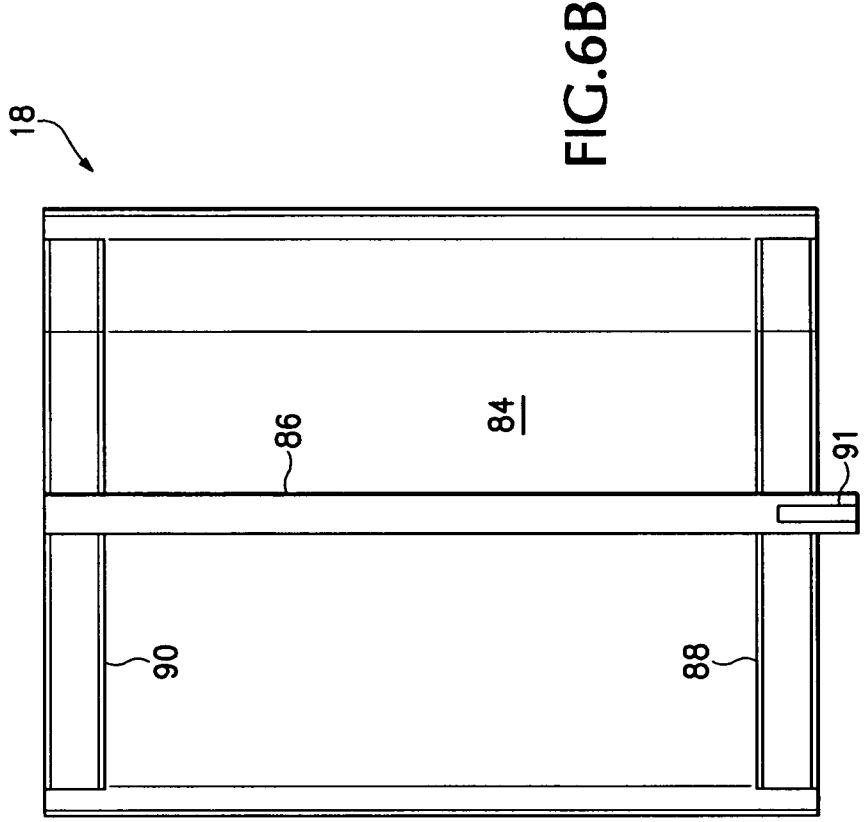
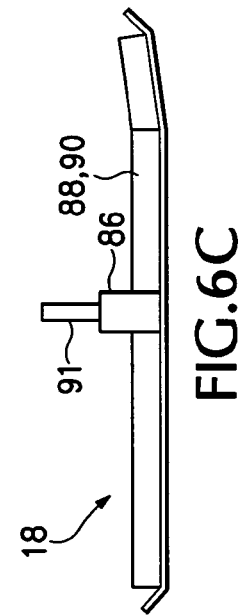
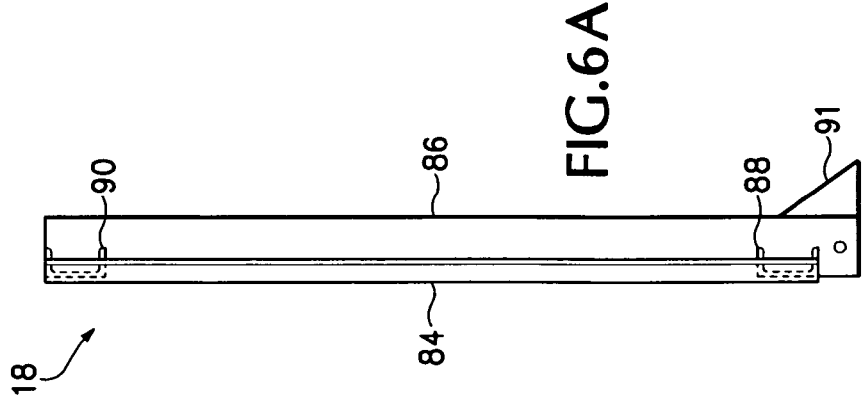
FIG.6B
FIG.6C
FIG.6A

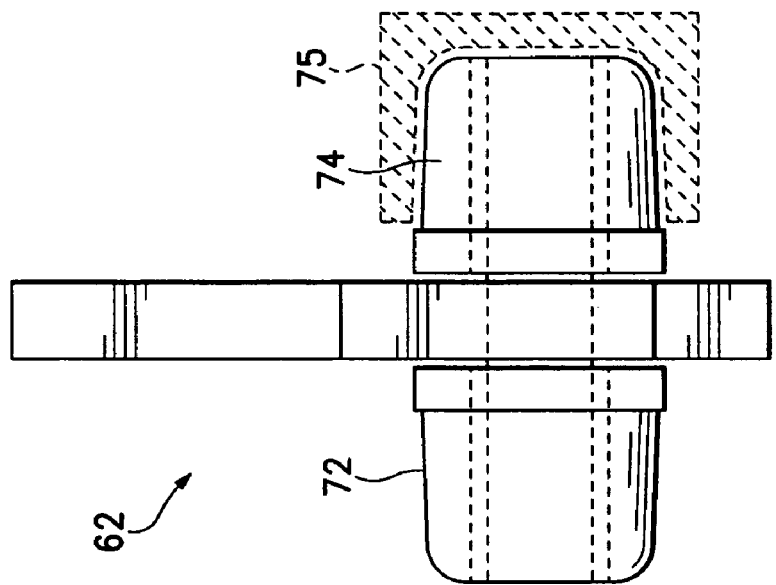
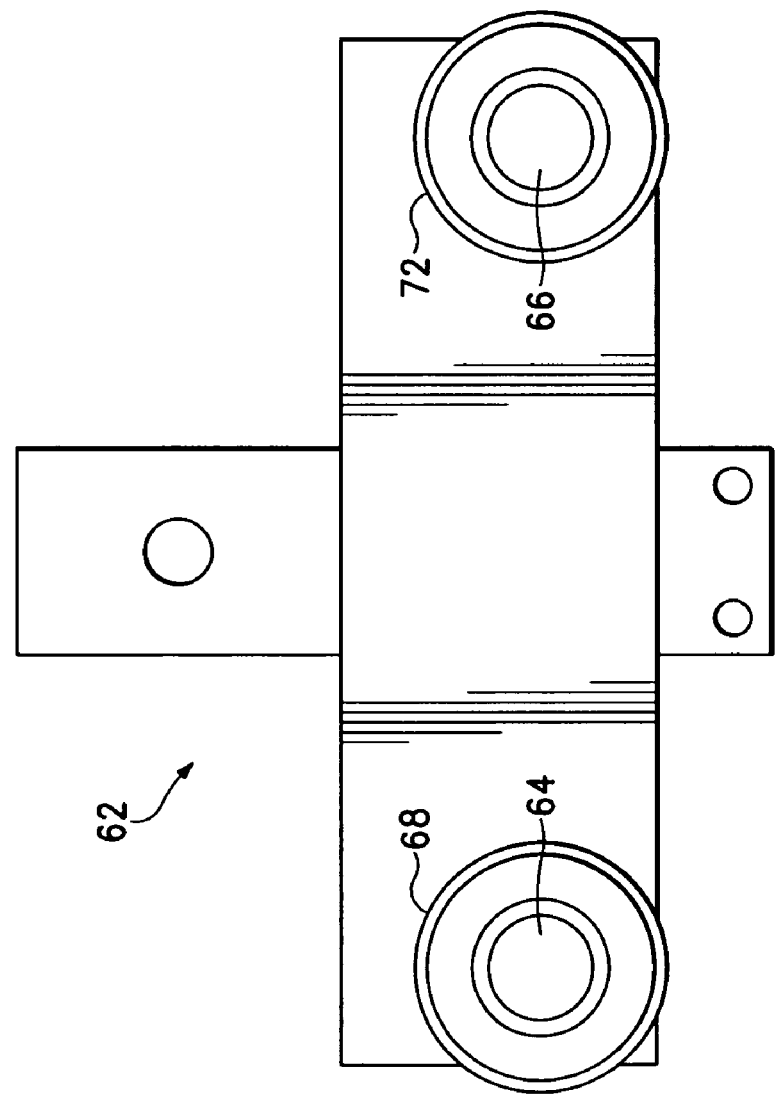
FIG.7B
FIG.7A

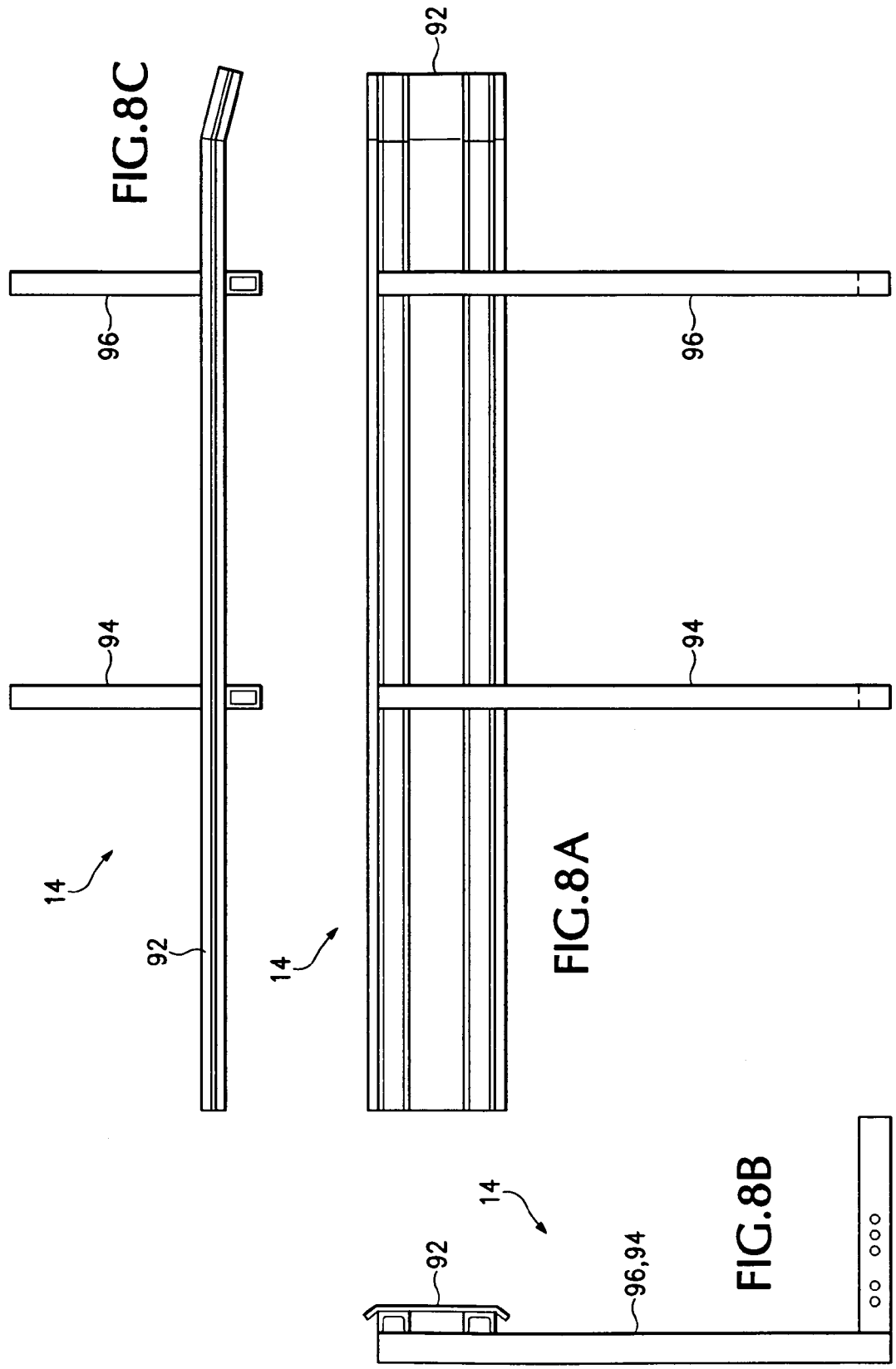

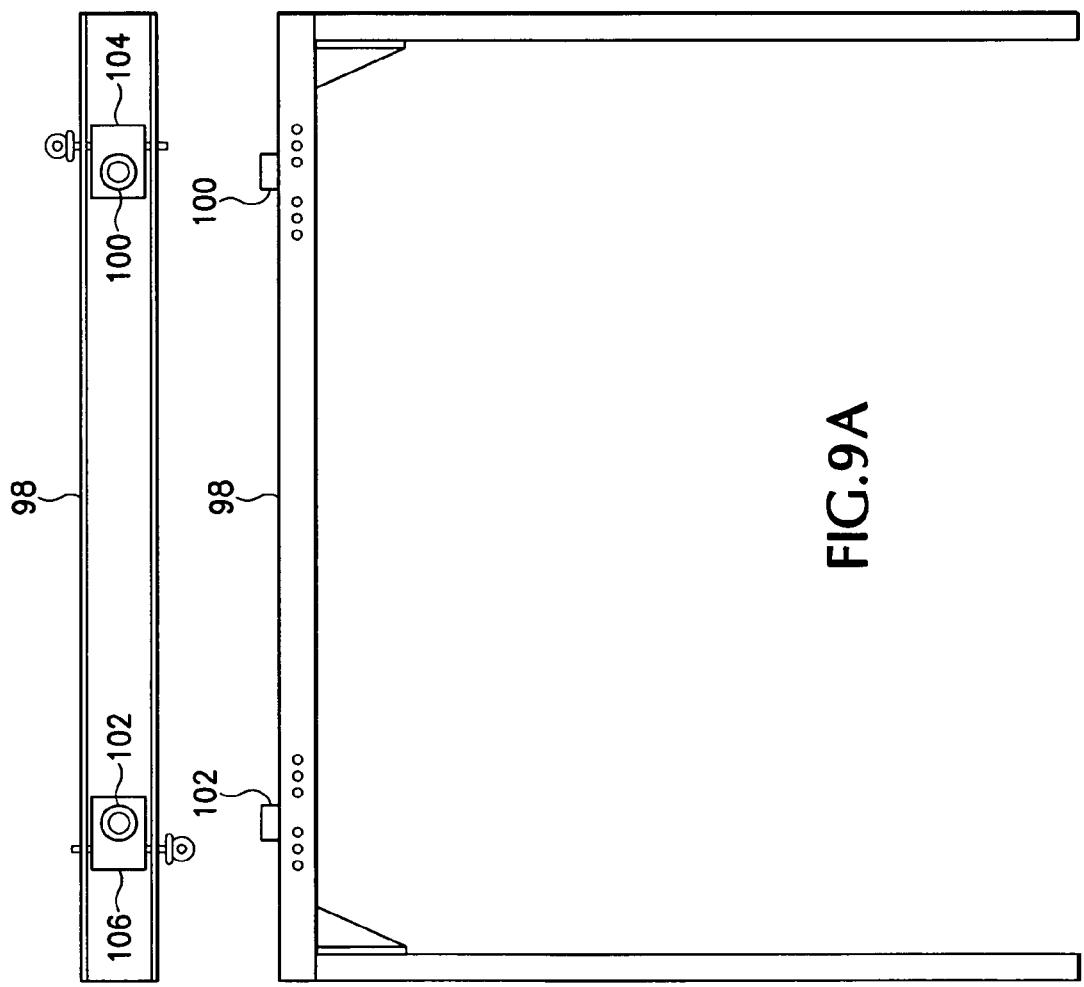

_US 7,721,984 B2_

HAY BALE FLAKE-SEPARATING AND FLAKE-DISPENSING SYSTEM AND DEVICE

RELATED APPLICATIONS

This application claims the benefit of priority to U.S. Provisional application No. 60/904,602, filed on Mar. 1, 2007 and entitled HAY BALE FLAKE-SEPARATING AND FLAKE-DISPENSING DEVICE, SYSTEM AND METHOD, the contents of which are hereby incorporated herein in their entirety by this reference.

FIELD OF THE INVENTION

This invention relates generally to the field of baled hay as livestock feed. More particularly, it concerns handling so-called square-baled hay to controllably distribute high-nutrient flakes as needed in a pasture for feeding livestock such as livestock.

BACKGROUND OF THE INVENTION

Conventionally, loaves or bales of hay (formed from "windrows" after the hay is cut) are dispersed by hand and shovel or pitchfork over a pasture as needed. The use even of a pitchfork incidentally damages the individual hay leaves/stems, often inadvertently knocking from the stem the hay's leaves, which contain most of the hay's protein and other nutrients, thereby reducing the nutritional content of the hay for livestock feed purposes. Semi-automatic or automatic means of dispersing hay for feed from un-strung bales for feed purposes heretofore have included devices that effectively pulverize the hay, which makes dispersing thereof quite simple but equally ineffective, since the nutritional value of the hay's leaves is greatly reduced by threshing or pulverizing the hay in the bale. Moreover, dispersing of hay for use as livestock feed conventionally is barely controlled if at all, since both the manual and the semi-automatic means described above rely on manual spreading and/or uncontrolled dispersing, both of which leave too little hay where livestock might be feeding or too much hay where livestock might not be feeding.

BRIEF DESCRIPTION OF THE DRAWINGS

FIGS. 4A and 4B respectively illustrate one of the two opposing flaker wheels of FIGS. 2 and 3, in a front elevation and a top plan view.

FIGS. 5A and 5B respectively are a bottom view and side elevation of the flaker device drive mechanism that form a part of the invention shown in FIGS. 1A and 1B.

FIGS. 6A, 6B and 6C respectively are a rear elevation, a side elevation and a top plan view of the pusher board that forms a part of the flaker device drive mechanism shown in FIGS. 5A and 5B.

FIGS. 7A and 7B respectively are a front and side elevation of the pusher block that forms a part of the flaker device drive mechanism shown in FIGS. 5A and 5B.

FIGS. 8A, 8B and 8C respectively are a front elevation, a side elevation and a top plan view of the fore board shown in FIG. 3.

FIGS. 9A, 9B and 9C respectively are a side elevation, a front elevation and a top plan view of the flaker wheel frame of FIGS. 1A and 1B, with Details A and B illustrating sections taken along the lines A-A and B-B respectively of FIG. 9A.

DETAILED DESCRIPTION OF THE PREFERRED EMBODIMENTS

The invention in accordance with a preferred embodiment involves a device, system and method for the controlled separating and dispensing of discrete flakes from a bale of hay in a pasture or enclosure to feed livestock such as livestock. The flakes are separated and dispensed by dropping in accordance with one embodiment of the invention by simple mechanical controls within the cab of a truck that mounts the device. The flakes are singularly and discretely dispensed by sequentially dropping them substantially intact so that their nutritional value is substantially undiminished. The flakes are dispensed wherever and whenever they are needed by simply driving around and pushing a lever that activates the bale conveyor and flaking device.

The flaking device in accordance with one embodiment of the invention features opposing flake wheels aligned with either side of the bale of hay, the flake wheels rotating freely as the bale is advanced therebetween along a drive mechanism (in what will be referred to herein as a passive flake-separating and flake-dispensing mechanism), the flake wheels each including a roller with a upper an lower pluralities of arcuately spaced blades aligned and dimensioned partly to penetrate and slightly to pressure or compress the bale of hay thus to separate a flake from an outward end thereof. Only the drive mechanism on which the bale of hay rests is driven, as by a hydraulic motor/chain/sprocket/push plate power mechanism that is easily turned on and off as needed or desired by a vehicle operator (other moving parts of the flaker device being passive or idle).

The accompanying drawings and the components depicted therein are referred to orientationally herein consistently with the direction of travel of the vehicle towing the invented flaker device. For example, it will be appreciated that front, left, right, and rear are relative to the forward, left, right and rearward of the directionally oriented vehicle, e.g. the tractor, shown in FIGS. 1A and 1B.

Figure 1:
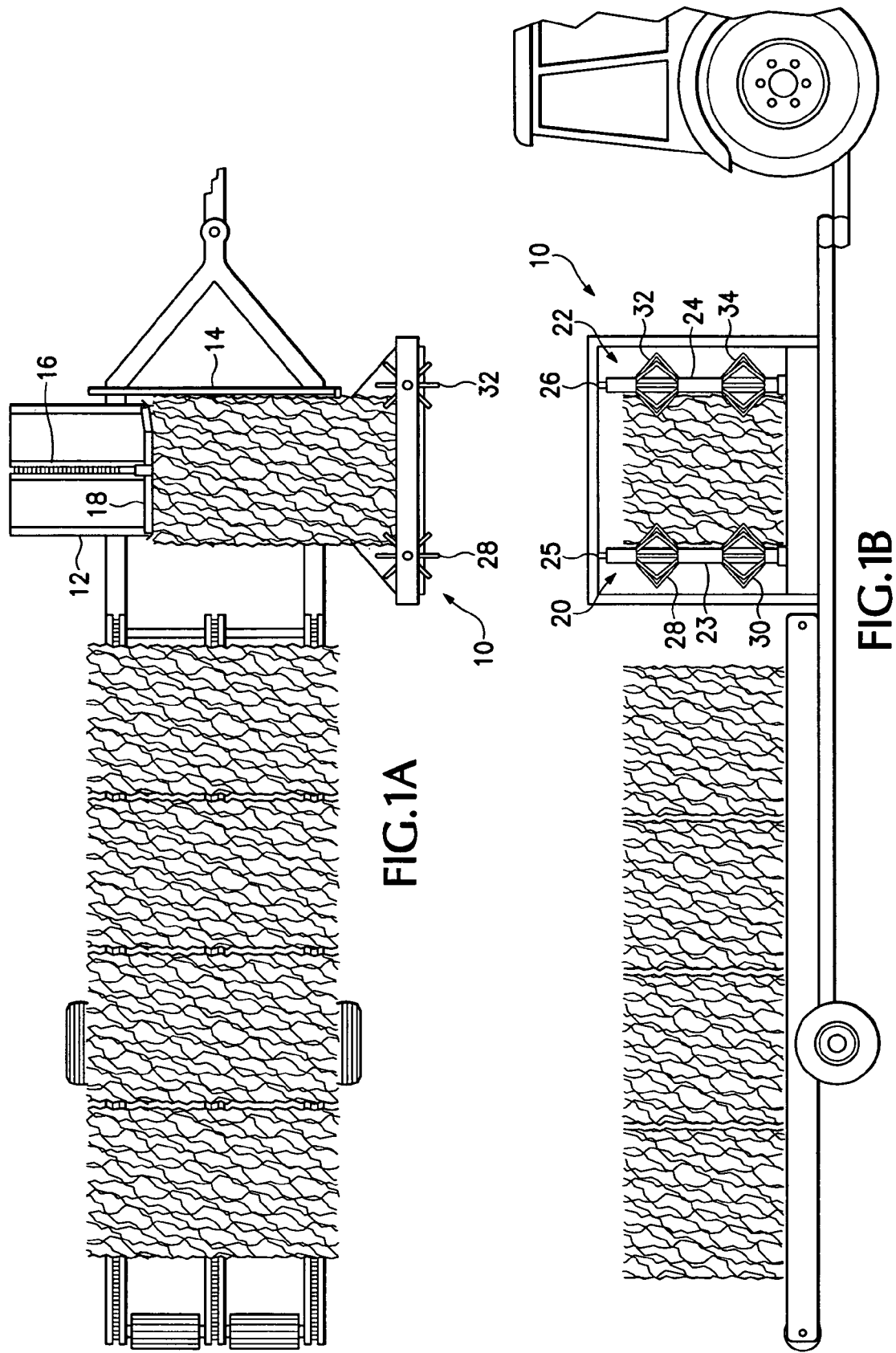
FIGS. 1A and 1B respectively are a top plan view and a side elevation illustrating the invention in accordance with one embodiment in which a flaker device is mounted for flake separating and dispensing from one or more bales of hay loaded on a stack mover towed by a vehicle.

FIGS. 1A and 1B illustrate the invented bale flaker device 10 coupled with a stack mover (or so-called "stack wagon"), the two being towed behind a vehicle such as a tractor. Those of skill in the art will appreciate that a square-baled hay can weight as much as 1800 pounds or more, depending upon density and moisture content. Those of skill also will appreciate that square-baled hay is alternatively dimensioned to be approximately 3'×3'×6', 4'×4'×6' or 4'×4'×8'. These are formidable sizes and weights, and thus robust drive mechanisms are required to transport them. Thus, plural bales of hay positioned on a stack mover as shown are transported by any suitable conveyance (e.g. a hydraulic motor-drive chain-and-sprocket system) toward the invented flaker device 10. In order to hold them together to maintain their individual integrity, it will be understood that the bales of hay are tied or stringed while stacked or advanced along the conveyance.

As bales of hay are advanced, a forward one thereof is advanced onto a bed 12 of flaker device 10. The driver of the tow vehicle aligns the bale on bed 12 against a fore board 14, and cuts the ties or strings. When the driver pushes a lever on the tow vehicle, a motor-chain-sprocket drive system or other suitable conveyance 16 including a push plate 18 advances the loose bale of hay laterally along bed 12. Flaker device 10 will be understood to exert slight pressure thus to compress the bale of hay thereon, as it is conveyed between opposing, counter-rotating, idle flaker wheels 20 and 22. Opposing flaker wheels 20 and 22 include freely rotating rollers 23 and 24 positioned on vertically oriented opposing spindles 25 and 26, with plural, arcuate blades such as blades 28, 30, 32 and 34 mounted on the rollers. Those of skill in the art will appreciate that the plural blades smoothly "knife" into the edge of the hay bale advancing there past and compress and penetrate a terminal region of the hay to separate a so-called flake, as illustrated.

The arcuate spacing of the blades and their depth of penetration are dimensioned such that they separate flakes approximately 4-6" thick. When the flake is separated and begins to fall from flaker device 10 toward the ground, the driver of the tow vehicle pulls the lever to stop the conveyance of the bale along bed 12. Those of skill in the art will appreciate that hay bales have a propensity for separation along any one of a near infinity of plural planes orthogonal to their long axis, which propensity is capitalized on by the current invention to produce uniformly sized and shaped, substantially intact flakes that exhibit high nutritional value because of their semi-automatic dispensing from flaker device 10.

It will be understood from an operational standpoint, after dispensing an entire bale, the driver of the tow vehicle returns the flaker device's conveyance to its initial position to accommodate another bale of hay, pushes a second, stack mover handle or lever (not shown) to load the next bale on the flaker device bed, leaves the tow vehicle's engine idling w/the steering wheel turned slightly, gets off the tow vehicle, unstrings or unties the bale that just landed on the flaker device bed and aligns it with fore board 14, returns to the tow vehicle, drives to the next flake drop destination, and again pushes the first flaker device lever (not shown) to separate and dispense the next flake where needed.

Figure 2:
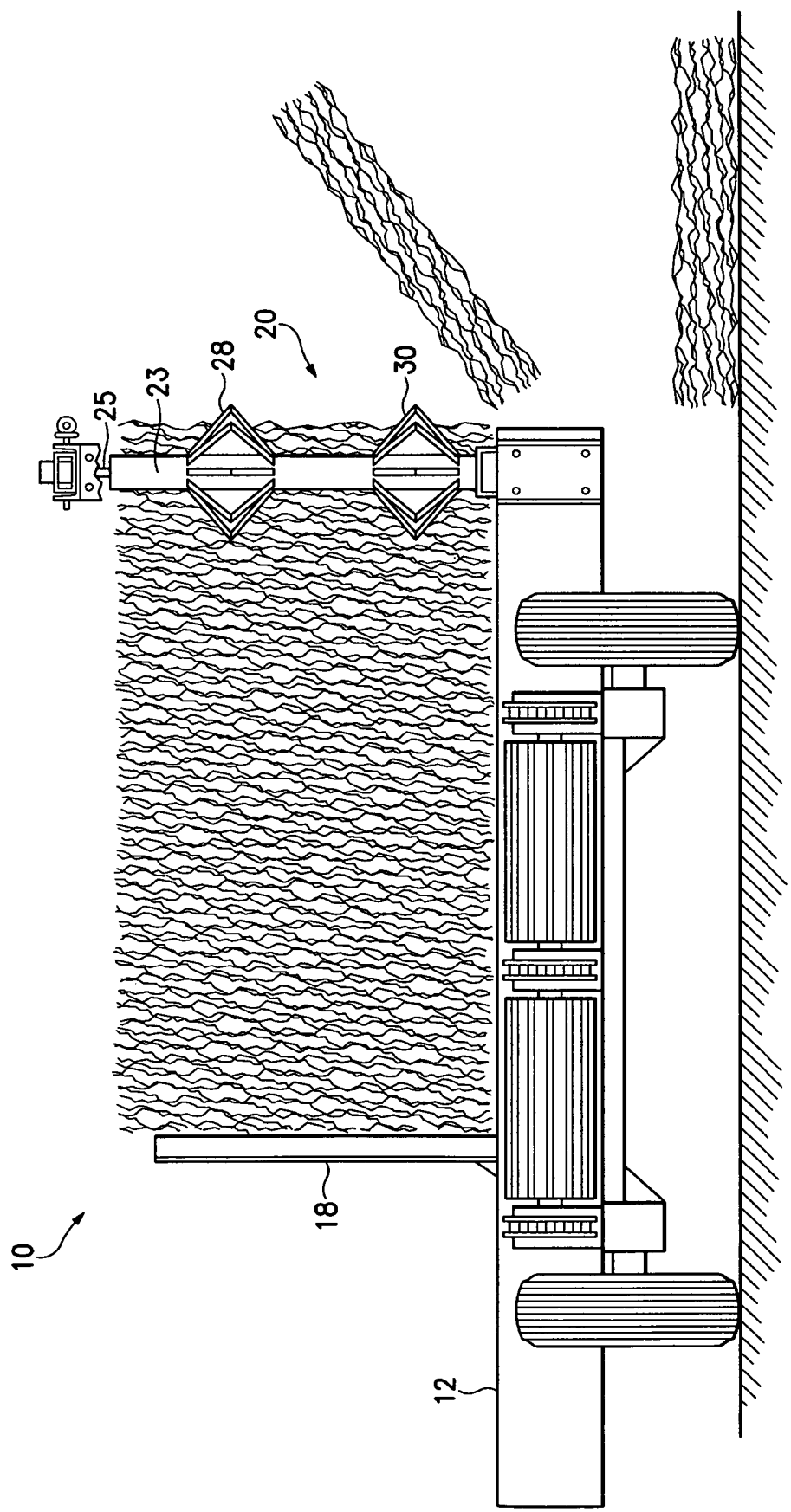
FIG. 2 is a rear elevation of the flaker device of FIGS. 1A and 1B, in accordance with one embodiment of the invention.

FIG. 2 illustrates operation of invented flaker device 10 from a forward-looking perspective, with flakes separated and dispensed therefrom to the right. The drawing is believed to be self-explanatory from the above discussion.

Figure 3:
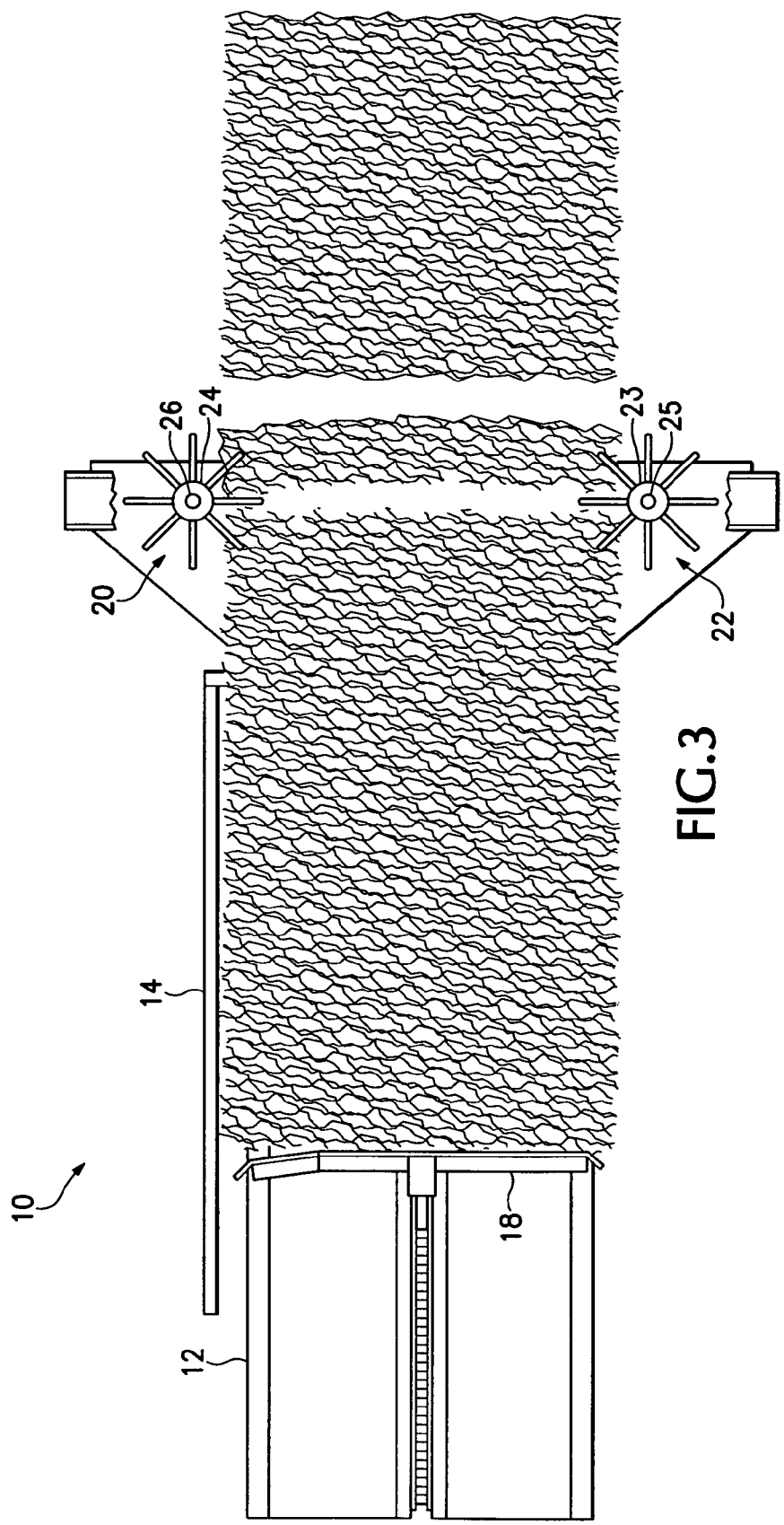
FIG. 3 is a cutaway top plan view of the flaker device corresponding to FIG. 2.

FIG. 3 illustrates operation of invented flaker device 10 from a downward-looking perspective, with flakes separated and dispensed therefrom also to the right. The drawing is believed to be self-explanatory from the above discussion.

FIGS. 4A and 4B illustrate one of two identical flaker wheels 20 and 22 that form flakes in operation within invented flaker device 10. Those of skill in the art will appreciate that wheels 20 and 22 are identically formed but when mounted on their spindles within the frame of the flaker device counter-rotate relative to one another. Those of skill also will appreciate that plural blades 28, 30 (which are typical but which represent only two of the sixteen blades provided on each of two flaker wheels 20 and 22, as illustrated) are formed of 5/8" thick hot-rolled steel in a generally isosceles triangular shape the right-angled vertex of which extend outwardly from the roller, in accordance with one embodiment of the invention. In another embodiment of the invention, each of the plural blades is formed as a 70° interior angle-bent length of round 5/8" diameter shaft with the ends sheared and welded to the wheels as described. (Such an alternative embodiment leaves a triangular opening in each blade that lowers the overall weight of the invented device and permits the hay's leaves and stems to intrude somewhat therein, through and around while an intact flake is being separated.) Each blade is dimensioned approximately as illustrated to have an approximately 5¾" depth and an approximately 11-12" height where attached, as by welding, to the roller. The blades are arranged in plural vertically aligned pairs each of which there are eight substantially evenly spaced arcuately around the roller's circumference.

Those of skill in the art will appreciate by brief reference to FIG. 4A that the number, placement, dimension, and arcuate spacing of the blades are such that the center one of the three inwardly oriented blades during the flaking operation penetrate the bale of hay on the bed of the flaker device by only approximately 2-3", while all three blades effectively compress and control a terminal end of the bale of hay. This structure and configuration has been discovered to be sufficient for slight compression and cutting separation of a flake but not sufficient for the trailing blade to interfere with the forward travel of the bale of hay. The flake is cleanly separated and gently released by the counter-rotation of the flaker wheels mounting the arcuately spaced and opposing, aligned pairs of upper and lower vertically aligned blades.

Thus, those of skill will appreciate that the invention may be characterized as combining a single non-driven (idle) pair of opposing laterally positioned rollers with a powered drive or transfer mechanism, wherein the roller pair and the blades mounted thereon neither pull nor push bale along its longitudinal axis, instead simply impacting it transverse thereto to create a separation between a terminal flake and the remainder of the bale of hay. Those of skill also will appreciate that alternative numbers, materials, dimensions, arcuate or lateral spacings, alignments and configurations of the rollers and the blades mounted thereon are contemplated, and are within the spirit and scope of the invention.

FIGS. 5A and 5B illustrate the drive mechanism 36 utilized in flaker device 10 to advance an un-stringed or untied bale of hay between flaker wheels 20 and 22 and onto the ground in neat flakes. Drive mechanism 36 in accordance with one embodiment of the invention includes a hydraulic motor 38 w/pressure relief driving a first 3" sprocket 40, which in turn drives a 9" sprocket 42 mounted on one end of a so-called "jack" shaft 44 via a #50 chain 46. Mounted on the opposite end of jack shaft 44 is a second 3" sprocket 48, which in turn drives a third 3" sprocket 50 via a #80 chain 52. Third sprocket 48 is mounted on a second shaft 54, which approximately centrally mounts a fourth 3" sprocket 56. Those of skill in the art will appreciate that the size ratio between first 3" sprocket 40 and 9" sprocket 42 provides a 3× torque advantage via known mechanical advantage principles, thereby avoiding wearing and bending of the shafts and thereby providing the needed torque to drive mechanism 36 to move a heavy bale of hay through flaker device 10.

Those of skill will appreciate that in accordance with another embodiment, motor 38 with sprocket 40, sprocket 42, and sprocket 50 can be aligned in a generally horizontal plane at approximately the elevation of an idle sprocket to be described immediately below. Such an elevational placement and alignment somewhat reduces the height of the device and makes it easier to stack and handle during manufacture or transit. This and other improved manufacturability features of the invention (e.g. increased reinforcement of the bed especially where the push arm drive components are mounted; a smooth transition-elevation structure between the bed and the stack mover that accommodates various makes and models thereof for universal compatibility; one or more S-shaped, bed-side-mounted hooks for use in breaking the string on a frozen bale of hay as the bale is conveyed onto the bed; etc.) are contemplated as being within the spirit and scope of the invention.

Fourth sprocket 56, as can be seen drives a #80 pusher chain 58 in a loop around a far-end and preferably chain-tension-adjustable fifth #3 idle sprocket 60. Durably connected to and interrupting pusher chain 58 between two adjacent links thereof is a pusher block 62. An upward extension of pusher block 62 will be understood to mount push plate 18 via aligned holes formed therein and any suitably secure pin or fastener (not shown). Pusher block 62 includes dual lateral spindles 64 and 66 on either ends of which quad outwardly tapered bushings or rollers 68, 70, 72 and 74 freely rotate. Those of skill will appreciate that fore and aft roller pairs such as roller pair 68, 70 travel within a so-called "ship" channel 75 that extends along a central longitudinal axis of bed 12 of flaker device 10. In accordance with one embodiment of the invention, channel 75 is slightly tapered outwardly on either end to conformingly fit with the slight outward taper of the rollers 68, 70, 72, 74. The channel can be made of any suitable material and generally will be understood to have the shape of a rectangle defined by opposite, inwardly facing U-shaped recesses. The bushings or rollers can be made of any suitable material such as bronzed steel.

Those of skill in the art will appreciate that more or fewer drive and/or idle sprockets are contemplated as being within the spirit and scope of the invention, as is a more direct drive mechanism for advancing the chain and push plate along what may be referred to herein as a hay bale drive mechanism. Those of skill in the art also will appreciate that manufacturability considerations may impact the number and placement of components and their couplings. Thus, changes to the embodiments disclosed and illustrated herein are contemplated, and all such changes in form are within the spirit and scope of the invention.

Those of skill will appreciate that hydraulic hoses 76, 78 and associated quick couplers 80, 82 are used to power hydraulic motor 38 via simple pressure-relief connection with the internal combustion engine of the tow vehicle or other suitable hydraulic pressure source. In accordance with one embodiment of the invention, hydraulic motor 38 is operated at approximately 1000 pounds of pressure to produce approximately 300 pounds of torque. Those of skill in the art also will appreciate that the hay bale "push plate" or "push arm" (driven by drive mechanism 36 across the bed of flaker device 10) described and illustrated herein alternatively but within the spirit and scope of the invention could be replaced with a moving conveyor belt so that the lateral conveyance of the hay bale toward the flaker wheels involves moving a surface beneath a stationary hay bale rather than sliding the hay bale across the stationary bed.

FIGS. 6A, 6B and 6C illustrate pusher plate 18 that couples with push block 62 and thus drive mechanism 36 to convey an un-stringed or untied bale of hay between the opposing flaker wheels by sliding the bale along the flaker device's stationary bed. Pusher plate 18 includes an upright planar expanse 84, a vertical stabilizer 86 and two horizontal stabilizers 88, 90. Vertical stabilizer 86 has a guide 91 at its base that keeps vertical stabilizer 86 substantially vertical during its travel along bed 12. In accordance with one embodiment of the invention, vertical stabilizer 86 has a slight bend on its rear end to act as a dimensionally tolerant guide for the next bale of hay to be loaded on bed 12, as shown.

FIGS. 7A and 7B illustrate the pusher block in more detail consistent with FIGS. 5A and 5B, and are believed to be self-explanatory.

FIGS. 8A, 8B and 8C illustrate the front or "fore" board 14 that aligns the un-stringed or untied bale of hay while it is forced between the opposed flaker wheels. Those of skill in the art will appreciate that fore board 14 in accordance with one embodiment of the invention includes a horizontal expanse 92 of any suitable construction, the expanse being mounted and elevated at a desired height above the bed of the flaker device by two L-shaped, preferably square tubular metal arms 94 and 96. The base of each L-shaped arm is spaced apart and otherwise dimensioned to fit into corresponding square tubular receivers of bed 12, as will be seen by reference below to FIG. 10B. Those of skill in the art will appreciate that fore board 14 at least nominally (and adjustably—see plural mounting holes in FIG. 8B) aligns the bale of hay being flaked by flaker device 10 with the opening defined between flaker wheels 20 and 22. Those of skill in the art will appreciate that the horizontal expanse of fore board 14 can be dimensioned and configured differently from that which is shown in FIGS. 8A, 8B, and 8C, within the spirit and scope of the invention, e.g. to further reduce weight and cost or otherwise improve manufacturability.

FIGS. 9A, 9B and 9C illustrate a flaker wheel frame 98 that mounts to the bed of the flaker device and that mounts for free rotation therein two opposing flaker wheels 20 and 22. Those of skill in the art will appreciate that frame 98 mounts the tops of spindles 25 and 26 for free-wheeling rotation within corresponding cylindrical collars 100 and 102 within square tubular slides 104 and 106, as shown. The spindles can be positioned and mounted within an elongate hole and any one of plural aligned pairs of slide-mounting holes (see the double-ended arrows) for adjustment of the opening between the flaker wheels to accommodate the nominal width of the bales of hay being flaked. Any suitable hardware including secure pins or fasteners can be used to assemble the preferably standard channel piece and hot-rolled steel piece frame into the upside-down U-shape shown (in side elevation) or any other suitable frame shape.

Figure 10B:
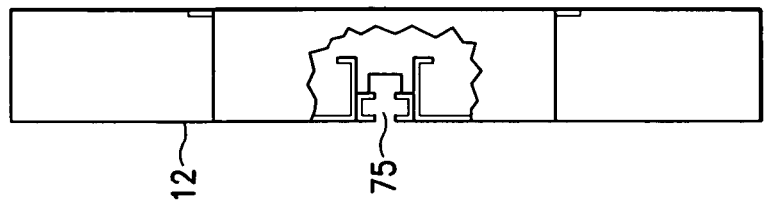
FIGS. 10A, 10B and 10C respectively are a front elevation, a left side elevation and a top plan view of the bed of the flaker device shown in FIGS. 1A and 1B.
Figure 10C:
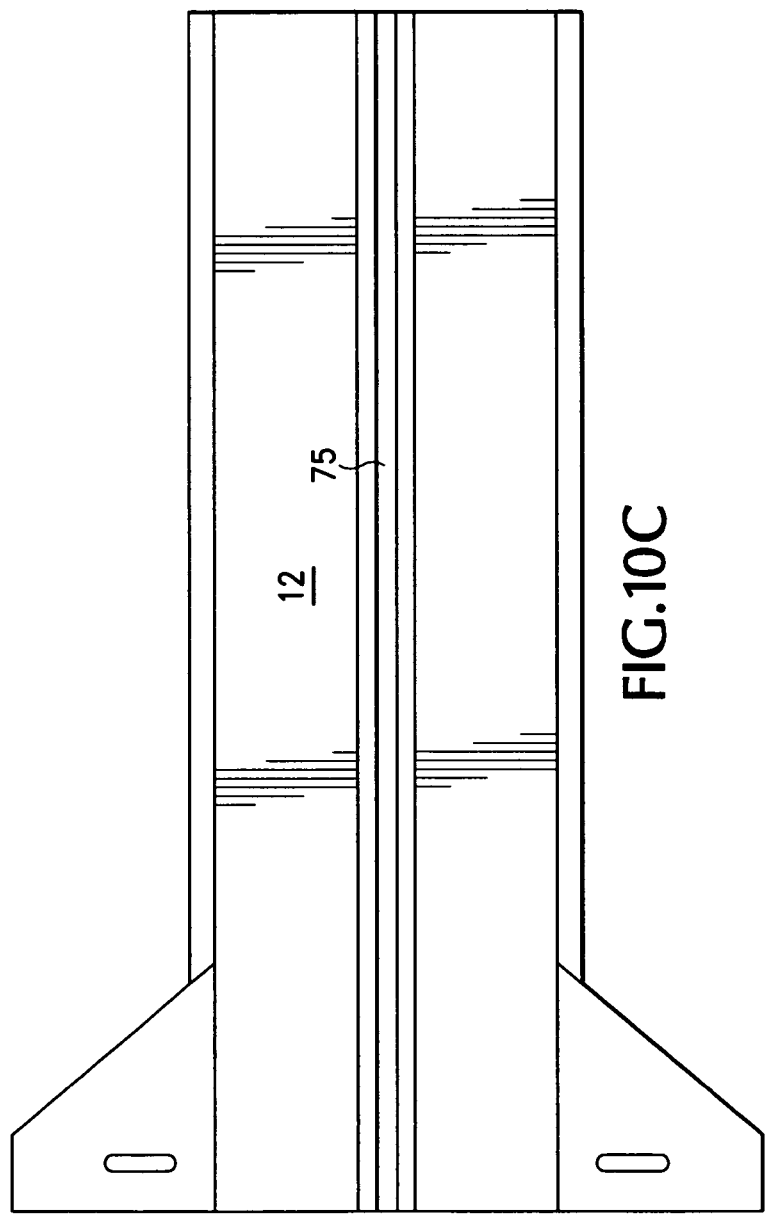
Figure 10A:
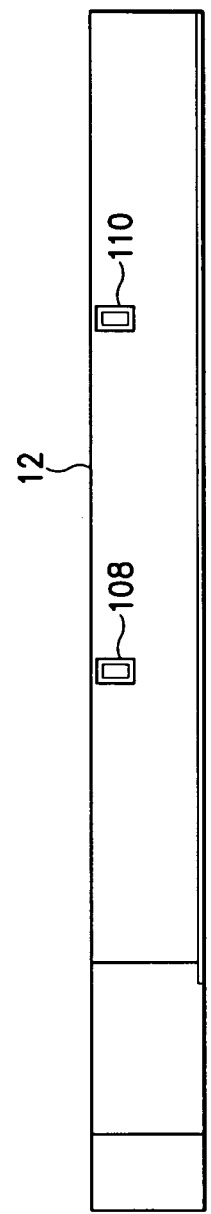

FIGS. 10A, 10B and 10C illustrate bed 12 of flaker device 10 that mounts frame 98 (not shown in FIGS. 10A, 10B and 10C but shown in FIGS. 9A, 9B and 9C) and ship channel 75 therein through which pusher block 62 (also not shown in FIGS. 10A, 10B and 10C but shown in FIGS. 5A, 5B, 7A and 7B) travels. Those of skill in the art will appreciate that bed 12 has pairs of slotted holes and mounting holes aligned in correspondence to those of frame 12 to mount the bottoms of spindles 25 and 26 for free-wheeling rotation therein. Bed 12 also includes dual laterally spaced, preferably square tubular metal receivers 108, 110 for securing the horizontal extents of L-shaped 94 and 96 of fore board 14. Those of skill in the art also will appreciate that any suitable materials can be used to construct bed 12 such as the formed hot-rolled (H.R.) steel pieces called out in the Bill of Materials (BOM).

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

The present invention avoids manual tools and manual or automatic crushing or stripping of leaves from stems of hay used for livestock feed, thereby increasing the effective delivery of nutrients to livestock such as cattle. The invention provides for the semi-automatic, controlled separation and dispensing of intact hay flakes where needed by simply pushing/pulling a handle or lever. The invention saves time and diesel fuel consumption by reducing many trips between barn and livestock. This is because plural bales are hauled around instead in one or two trips and each is flaked and dispensed exactly where needed. The invented flaker device nevertheless is simple to install, adjust, deploy, operate and maintain.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A hay bale flaking device comprising:
    a bed configured to support a hay bale, the bed including a flake-dispensing edge region;
    a selectively operable push arm for advancing the hay bale along the bed toward the edge region thereof; and
    a pair of spaced-apart idle and counter-rotatable wheels defining a substantially hay bale width opening therebetween within the edge region of the bed, each wheel including plural arcuately spaced-apart blades configured to separate a hay bale into successive flakes as a hay bale is advanced along the bed and through the opening and between the counter-rotatable wheels.

2. The device of claim 1 further comprising: a wheeled truck for mounting the bed.

3. The device of claim 2, wherein the truck includes a hitch for towing the device behind a tractor.

4. The device of claim 3, wherein the push arm is selectively operable by a motor, one or more sprockets, and a chain drive operatively coupled with the push arm.

5. The device of claim 4, wherein the selective operation of the push arm is remotely controlled by a driver of a tractor towing the truck, thereby to controllably dispense the successive flakes.

6. The device of claim 5, wherein the bed extends generally transverse to a direction of travel of the truck, whereby flakes can be dispensed laterally from the device.

7. The device of claim 1 further comprising:
    a stationary guide member mounted on an edge of the bed, the guide member configured to align the hay bale with the opening as the hay bale is advanced theretoward.

8. The device of claim 1, wherein the wheels are aligned vertically and wherein each wheel includes plural aligned columns each column including plural blades.

9. The device of claim 1 further comprising:
    a selectively powered conveyor for loading a succession of plural hay bales onto the bed for flaking.

10. The device of claim 9, wherein the bed extends perpendicularly to the conveyor adjacent a forward region of the conveyor.

11. The device of claim 1, wherein a spacing between the pair of spaced-apart idle wheels is adjustable to accommodate hay bales of various widths.

12. A hay bale flaking device comprising:
    a bed configured to support a hay bale, the bed including a flake-dispensing edge region;
    a selectively operable push arm for advancing the hay bale along the bed toward the edge region thereof, wherein the push arm is selectively operable by a motor, one or more sprockets, and a chain drive operatively coupled with the push arm;
    a pair of spaced-apart idle and counter-rotatable and vertically aligned wheels defining a substantially hay bale width opening therebetween within the edge region of the bed, each wheel including plural aligned columns each column including plural arcuately spaced-apart blades configured to separate a hay bale into successive flakes as a hay bale is advanced along the bed and through the opening and between the counter-rotatable wheels;
    a stationary guide member mounted on an edge of the bed at generally a right angle to the flake-dispensing edge region, the guide member configured to align the hay bale with the opening as the hay bale is advanced theretoward; and
    a wheeled truck for mounting the bed, wherein the truck includes a hitch for towing the device behind a tractor,
    wherein the selective operation of the push arm is remotely controlled by a driver of a tractor towing the truck, thereby to controllably dispense the successive flakes, and
    wherein the bed extends generally transverse to a direction of travel of the truck,
    whereby flakes can be dispensed laterally from the device.

* * * * *